US011673440B2

(12) United States Patent
Haddock et al.

(10) Patent No.: US 11,673,440 B2
(45) Date of Patent: Jun. 13, 2023

(54) TRAILER JACK SUPPORT

(71) Applicant: MIRO Industries, Inc, Heber City, UT (US)

(72) Inventors: Jason Reed Haddock, Heber City, UT (US); Samuel Richard Robins, Heber City, UT (US); Jarrett Welch, Heber City, UT (US); Robb Neal Davis, Orem, UT (US); Daniel Noble, Heber City, UT (US)

(73) Assignee: MIRO Industries, Inc., Heber City, UT (US)

( * ) Notice: Subject to any disclaimer, the term of this patent is extended or adjusted under 35 U.S.C. 154(b) by 76 days.

(21) Appl. No.: 17/384,470

(22) Filed: Jul. 23, 2021

(65) Prior Publication Data

US 2022/0339980 A1    Oct. 27, 2022

(51) Int. Cl.
 *B60D 1/66*    (2006.01)
(52) U.S. Cl.
 CPC ..................................... *B60D 1/66* (2013.01)
(58) Field of Classification Search
 CPC ...................................................... B60D 1/66
 USPC .......... 248/176.3, 346.01; 254/418; 269/131, 269/311, 314, 313
 See application file for complete search history.

(56) References Cited

U.S. PATENT DOCUMENTS

| 3,970,278 | A | | 7/1976 | Studer | |
|---|---|---|---|---|---|
| 5,009,444 | A | * | 4/1991 | Williams, Jr. | ........... B60D 1/36 254/420 |
| 5,328,154 | A | | 7/1994 | Blatz et al. | |
| 6,874,745 | B1 | * | 4/2005 | Bean | ......................... B60S 9/02 410/30 |
| 10,611,346 | B2 | | 4/2020 | Andersen | |
| 2008/0251660 | A1 | * | 10/2008 | Spyker | ...................... B63C 5/02 248/176.1 |
| 2013/0181105 | A1 | * | 7/2013 | Shirey | ....................... B60S 9/22 248/346.03 |
| 2015/0028177 | A1 | * | 1/2015 | Vargas | ...................... B60S 9/02 248/542 |
| 2019/0299943 | A1 | | 10/2019 | Gregory | |
| 2022/0339980 | A1 | * | 10/2022 | Haddock | .................. B60D 1/66 |
| 2022/0363099 | A1 | * | 11/2022 | Hancock | ................... B60S 9/02 |

\* cited by examiner

*Primary Examiner* — Muhammad Ijaz
(74) *Attorney, Agent, or Firm* — Lee & Hayes, P.C.

(57) ABSTRACT

A trailer jack support apparatus configured to support trailer hitches includes a monolithic block having six sides with the trailer jack support being in the shape of a square frustrum or trapezoid. The top of the trailer jack support includes a number of protrusions which extend from the trailer jack support. Further, the top side has a recess and a void located at the bottom of the recess. In addition, the bottom of the trailer jack support includes numerous recesses defined therein and may engage with the protrusions extending from the top of a second trailer jack support.

19 Claims, 8 Drawing Sheets

FIG. 8

TRAILER JACK SUPPORT

TECHNICAL FIELD

The present disclosure relates generally to supports for trailers. Specifically, the present disclosure relates to systems and methods for supporting a tongue of a trailer or stabilizer jacks of a trailer via a number of trailer jack supports.

BACKGROUND

Trailers for commercial, personal, recreational, and pother purposes are used ubiquitously throughout the world. As trailers are being constructed of all shapes and sizes, with differing features, challenges associated with supporting a trailer hitch while disconnected from a vehicle arise. While these challenges are numerous, some include providing secure and safe support to the trailer while disconnected from the vehicle. Other challenges may include providing support for all trailers, regardless of the trailer hitch configuration.

Existing trailer hitch support mechanisms are inadequate as trailers are configured with various hitch attachments. Depending on the trailer, a hitch jack coupled to a tongue of the trailer may include a wheel, a rectangular foot, a circular pipe, or other types of devices. Further, the tongue of the trailer may not include a hitch jack, and the manner in which the tongue is supported may occur directly at a coupler, a chassis frame, or other part of the tongue. As such, the various trailer hitch jacks and trailer tongues have restricted the way trailer hitch supports or trailer jack supports have been built. Accordingly, the present disclosure is directed towards providing a trailer jack support or block to support a trailer, regardless of the trailer hitch jack or tongue configuration.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

The present disclosure is directed towards a trailer jack support configured to support trailer tongues and hitch jacks. The trailer jack support enables trailer hitch jacks of various configurations to securely engage with the support. The trailer jack support also allows for the support of a chassis of the trailer including a tongue portion of the chassis to be supported directly through direct interfacing and/or engagement with the trailer jack support.

The trailer jack support may include a monolithic block having six sides with a recess defined in the top side. The trailer jack support contains inverted corners defined in a junction between each of the connecting sides. Further, the monolithic block is trapezoidal in shape.

The recess on the top side includes at least one void defined in the recess. The top side of the block includes a rectangular void. The rectangular void may be dimensioned to accept a rectangular stabilizer, a rectangular foot, or the like. Additionally, the top of the block includes at least one half-moon recess defined in the top side of the block. The half-moon recess may be dimensioned to accept a caster, a wheel, or similar round device that may seat within the half-moon recess. In addition, the top side of the block may also include a circular void, the circular void is dimensioned to accept a pipe, a circular stabilizer, a circular foot, or similar circular element that may be attached to a hitch jack coupled to a tongue of the trailer.

Also found on the top of the block are at least one protrusion that extends from the top side of the block. Each protrusion has a notch defined in a corner closest to the center of the block. The notches are defined to align a rectangular stabilizer, rectangular foot, square foot, or similar rectangular element that may be attached to a hitch jack coupled to a tongue of the trailer and seated between the protrusions.

The trailer jack support also contains recesses which extend into the bottom side. Further, the protrusions on the top side of a first monolithic block may engage with the recesses on a bottom side of the second monolithic block such that the second monolithic block may stack on top of, and engages with, the first monolithic block.

The block may be created by using plastic, recycled plastic, rubber, wood, metal, or combinations thereof.

OVERVIEW

In at least one example, a hitch jack or a portion of the tongue of the trailer may be placed on a trailer jack support such as a block- or box-like structure in order to provide support and stability while the trailer is disconnected from a vehicle. A hitch jack may be used to level the trailer during storage and raise or lower the height of the tongue of the trailer for hitching and unhitching the trailer to a towing vehicle. Further, the trailer may include a chassis frame or other part of the tongue to which a number of block- or box-like structures may be used to support the tongue of the trailer when not coupled to a vehicle.

While engaging with the trailer jack support, the trailer jack or trailer tongue is secure due to the configuration of the trailer jack support. For example, a hitch jack coupled to a tongue of the trailer may include a rectangular foot, a rectangular stabilizer, a square foot, or other types of devices which may be placed on the top side of the block. Further, the notched protrusions extending from the top side of the trailer jack support act as a securing mechanism when the rectangular foot, rectangular stabilizer, square foot, square stabilizer or other type of device is placed between the protrusions, with the corners of the rectangular or square stabilizer or foot engaging with each of the notches of the one or more protrusions.

In another example, a hitch jack coupled to a tongue of a trailer may include a rectangular foot or stabilizer that is too large to allow the corners of the rectangular foot or stabilizer to engage with the protrusion notches. In this situation, the hitch jack including the rectangular foot or stabilizer may be placed on top of the one or more protrusions. Further the corners of the hitch jack including the rectangular foot or stabilizer may be placed between the protrusions.

In at least one example, a trailer hitch may engage with the recessed or void portion of the top side of the trailer jack support. For example, a trailer may have a wheel or caster coupled to a bottom end of the hitch jack which may be placed in a half-moon shaped recess on the top side of the trailer jack support. A rectangular recess which is in the shape of a half-moon provides a secure location for a wheel or caster to be seated. In yet another example, a trailer may include a hitch jack including a circular stabilizer, a circular foot, a circular pipe, or other type of circular device. The circular stabilizer, circular foot, or other type of circular device may be seated between the protrusions extending from the top side of the trailer jack support to secure the hitch from sliding off the trailer jack support. Further, if the circular stabilizer or foot is too large to fit within the protrusions, it can be placed on top of the protrusions. In yet another example, a circular pipe may be placed through a circular void defined in the top side of the trailer jack support. The circular void does not extend through the block, keeping the circular pipe from digging into the ground.

In at least one example, a trailer may be placed on uneven ground (e.g., sand, loose dirt, mud, rocks, gravel, etc.). When the trailer jack support is placed on such an uneven ground, the recessed portions which are defined in and extend into the bottom side of the trailer jack support conform to, and grip with, the uneven ground reducing the potential of the trailer jack support slipping.

Further, in one example, a trailer may include a number of stabilizing jacks. These stabilizing jacks may be located, for example, at corners of the trailer, and may be used to stabilize and/or level the trailer. In one example, a number of the trailer jack supports may be used in connection with the stabilizing jacks of the trailer. Thus, although examples provided herein may be described in connection with a main trailer jack located at the tongue of the trailer, the trailer jack supports may be used to support any type of jack or similar device.

In another example, a trailer may be constructed to rest high off the ground or may not include a hitch jack. In these situations, multiple trailer jack supports may be stacked to allow the trailer to rest at a balanced, level height. When a first trailer jack support is stacked on a second trailer jack support, the first trailer jack support may be placed on the ground and a second trailer jack support may be placed on top with the recessed portions, which extend into the bottom side of the second trailer jack support, engaging with the protrusions extending from the top side of the first block. Two or more trailer jack supports may be stacked to achieve a desired height.

EXAMPLE EMBODIMENTS

Figure 1:
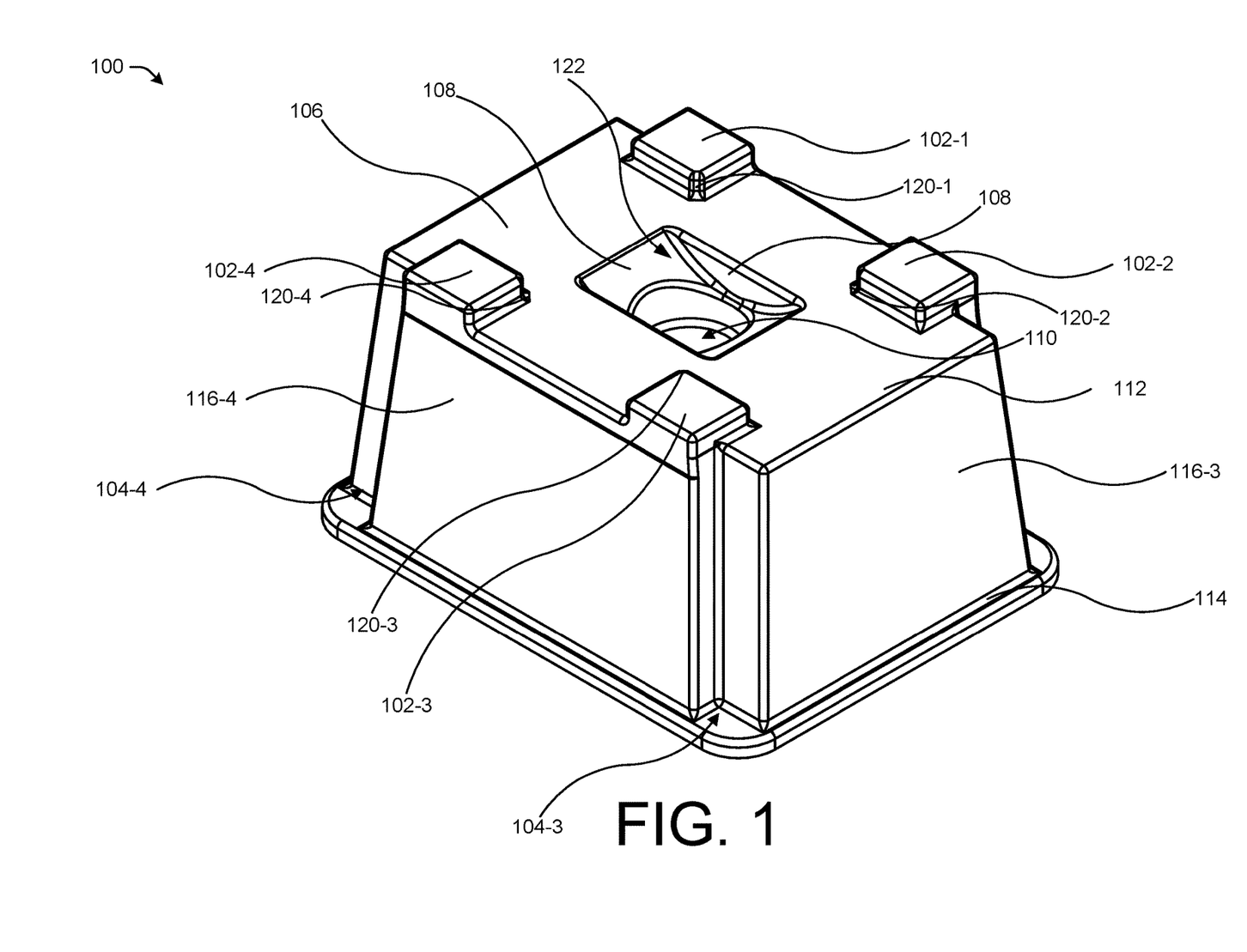
FIG. 1 illustrates an isometric view of a trailer support for a trailer tongue.
Figure 2:
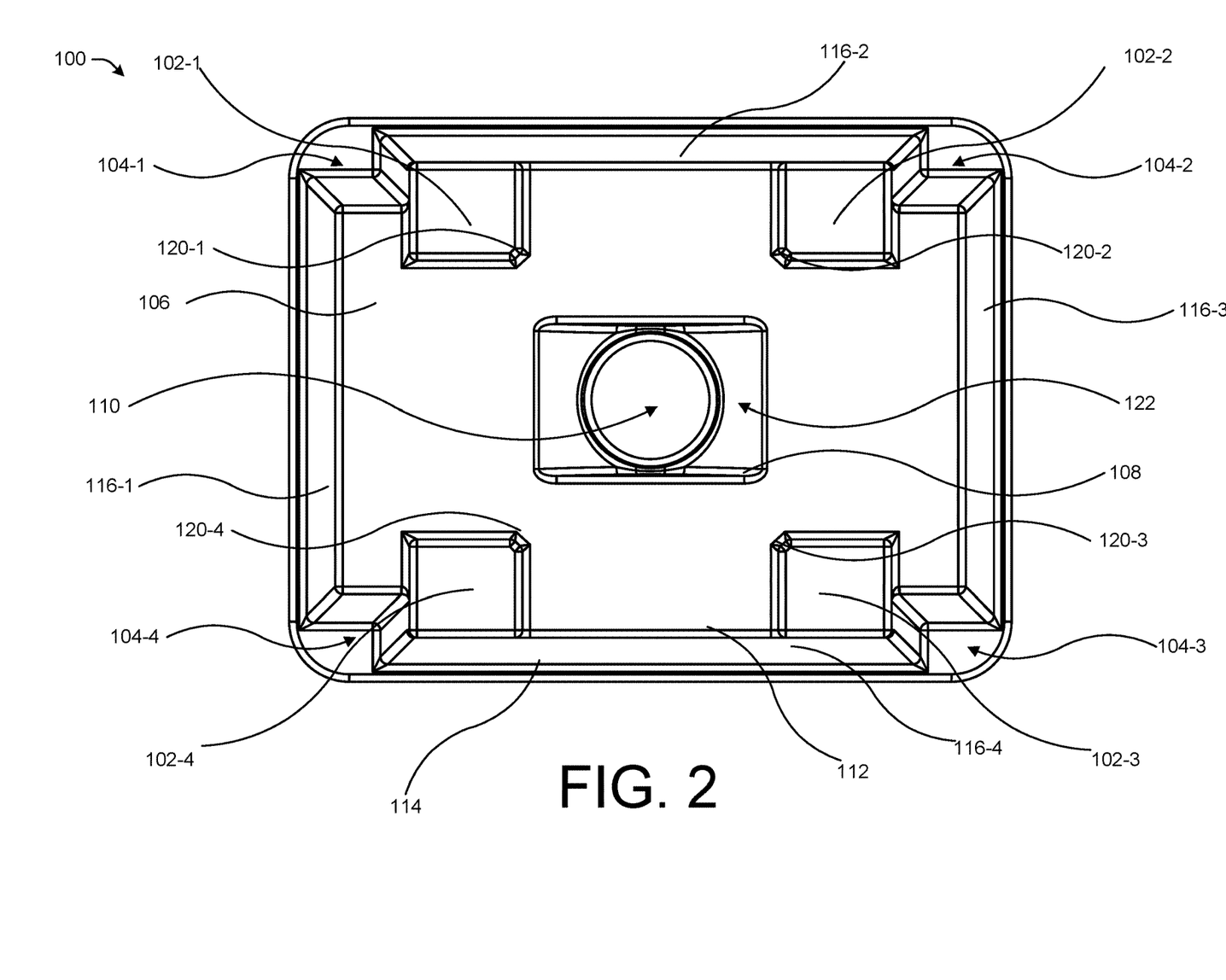
FIG. 2 illustrates a top view of the trailer jack support of FIG. 1.
Figure 3:
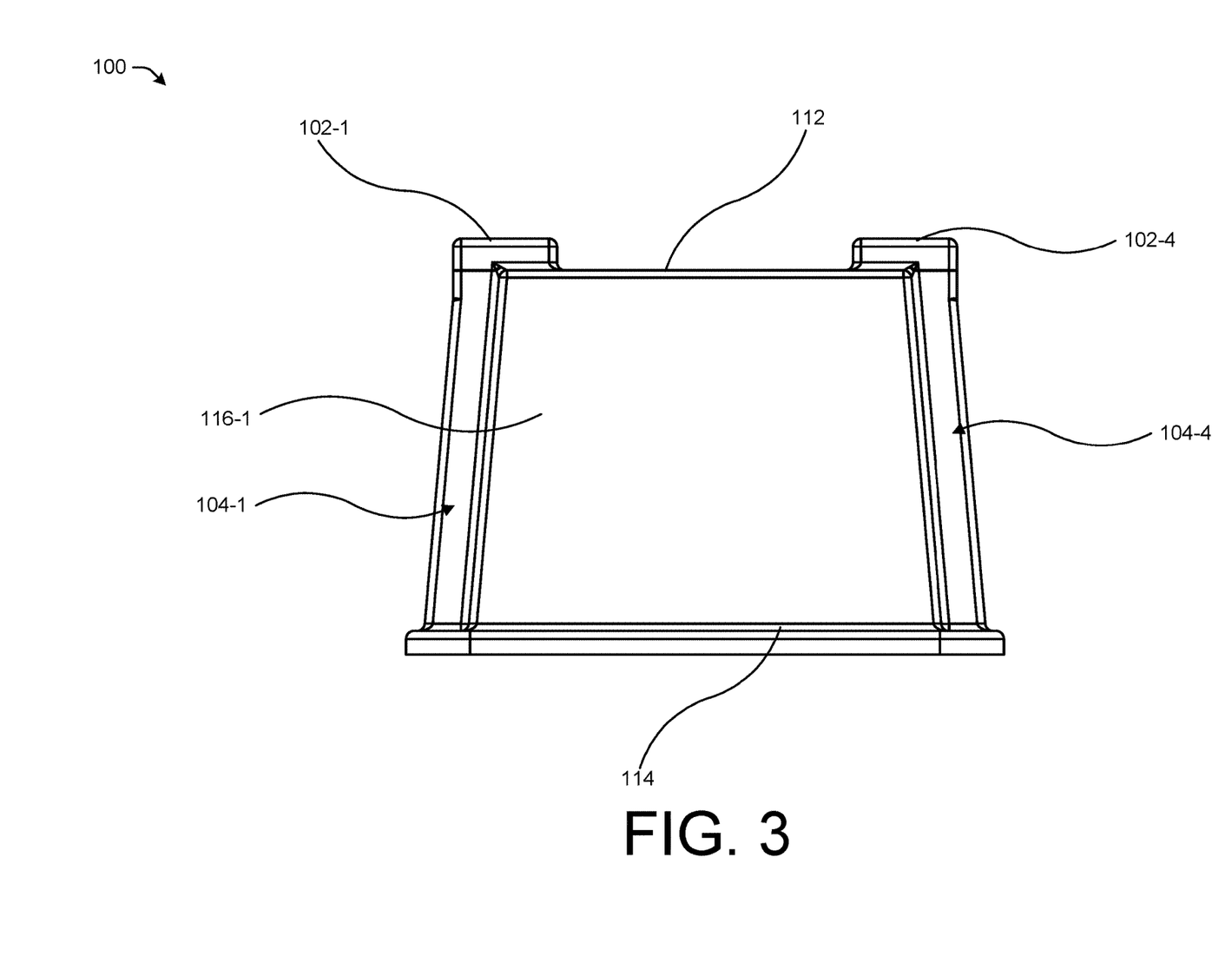
FIG. 3 illustrates a first side view of the trailer jack support of FIG. 1.
Figure 4:
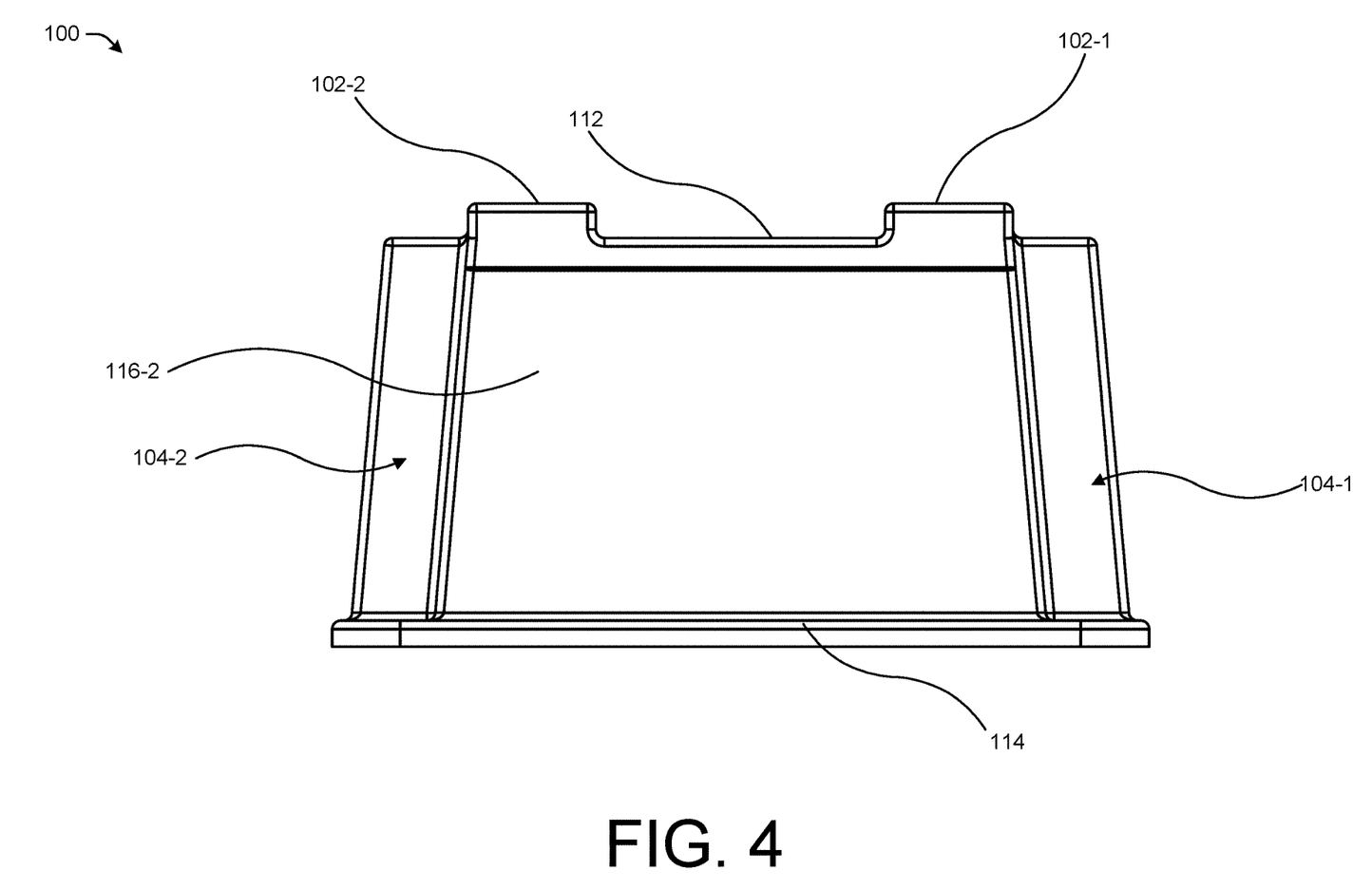
FIG. 4 illustrates a second side view of the trailer jack support of FIG. 1.
Figure 5:
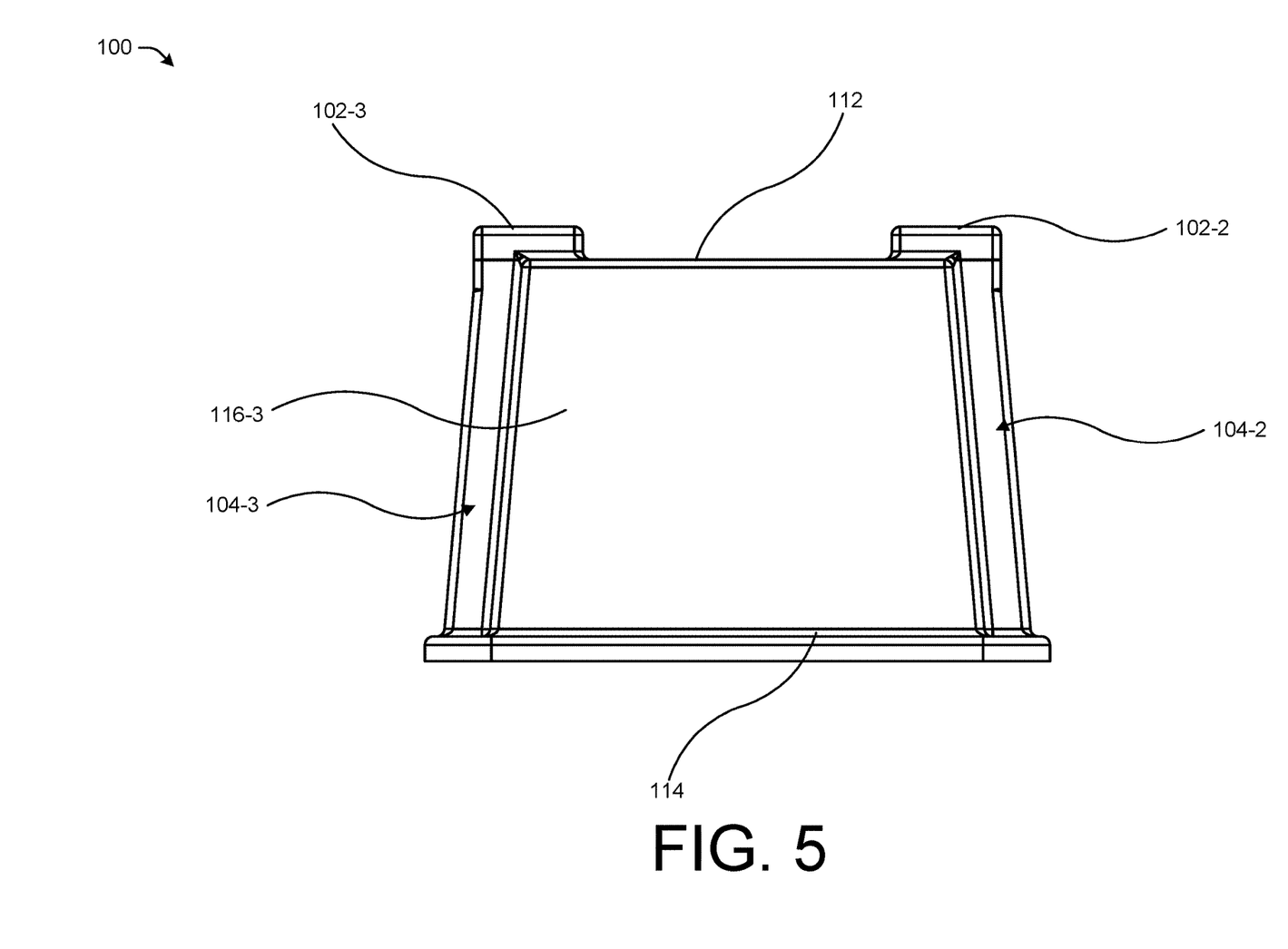
FIG. 5 illustrates a third side view of the trailer jack support of FIG. 1.
Figure 6:
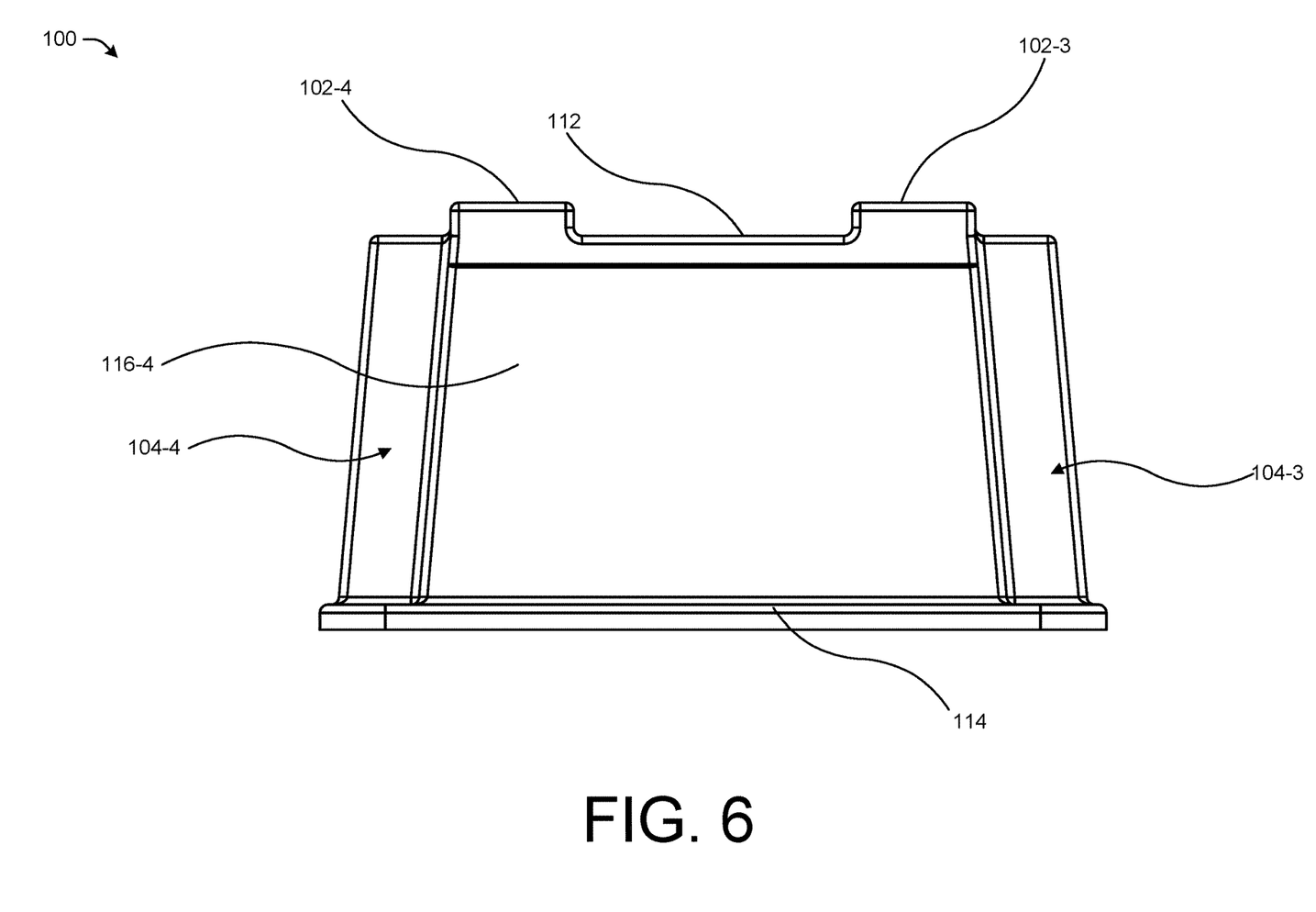
FIG. 6 illustrates a fourth side view of the trailer jack support of FIG. 1.

Turning now to the figures, FIG. 1 illustrates an isometric view of the trailer jack support 100. FIG. 2 illustrates a top view of the trailer jack support 100 of FIG. 1. FIG. 3 illustrates a first side view of the trailer jack support 100 of FIG. 1. FIG. 4 illustrates a second side view of the trailer jack support 100 of FIG. 1. FIG. 5 illustrates a third side view of the trailer jack support 100 of FIG. 1. FIG. 6 illustrates a fourth side view of the trailer jack support 100 of FIG. 1.

The trailer jack support 100 may be of the form of a monolithic block and may include sides 116-1, 116-2, 116-3, 116-4 (collectively referred to as "side(s) 116") in addition to a top side 106. In one example, sides 116-2 and 116-4 may be of different dimensions with respect to sides 116-1 and 116-3.

A number of protrusions 102-1, 102-2, 102-3, and 102-4 (collectively referred to as "protrusion(s) 102") are depicted in FIGS. 1 through 6 to extend or protrude from the top side 106 of the trailer jack support 100. In one example, the protrusions 102 may be located approximately at the corners of the top side 106 of the trailer jack support 100.

A number of notches 120-1, 120-2, 120-3, and 120-4 (collectively referred to as "notch(es) 120") may be defined in the corner of each protrusion 102 that faces the center of the trailer jack support 100. In one example, a trailer hitch jack including a rectangular or square foot or stabilizer may be placed on the top side 106 of the trailer jack support 100 with the corners of the rectangular or square foot or stabilizer engaging with the notches 120. The engagement of the rectangular or square foot or stabilizer with the notches 120 further secures the rectangular or square foot or stabilizer with respect to the trailer jack support 100 by ensuring that the rectangular or square foot or stabilizer are maintained in an approximately center portion of the trailer jack support 100. Further, the notches 120 assist in ensuring the rectangular or square foot or stabilizer does not slide off or disengage from the trailer jack support 100.

In one example, a hitch jack coupled to a tongue of a trailer that includes a rectangular or square foot or stabilizer that is too large to be seated between all four of the 120 notches the rectangular or square foot or stabilizer may be turned approximately 90 degrees (°) so the corners of the rectangular or square foot or stabilizer are placed between the protrusions 102. In this example, the sides of the rectangular or square foot or stabilizer may be placed between the protrusions 102 with the corners of the rectangular or square foot or stabilizer not engaging with the notches 120. In this manner, the protrusions 102 assist in further ensuring that the rectangular or square foot or stabilizer does not slip or slide off the trailer jack support 100 in instances where the rectangular or square foot or stabilizer is larger in dimension than the space between the protrusions 102.

Further, in one example, the rectangular or square foot or stabilizer may be too large to engage with the notches 120 and also too large to engage with the protrusions at 90° with respect to the protrusions 102. In this example, the rectangular or square foot or stabilizer may be placed on top of each of the protrusions 102.

FIGS. 1 through 6 also displays the top perimeter 112 of the trailer jack support 100 and the bottom perimeter 114 of the trailer jack support 100. The perimeter of the bottom perimeter 114 is larger than the perimeter of the top side 106 creating a trapezoidal shape, or, more specifically, a square frustum. The square frustum assists in stabilizing the trailer jack support 100 when weight is placed thereon. In one example, a trailer hitch jack with a rectangular or square foot or stabilizer may be misplaced on the edge of the top side 106. Due to the square frustum, the trailer jack support 100 may remain stable instead of tipping or flipping over as may happen if the block was made to be a different shape.

The trailer jack support 100 also has inverted corners 104-1, 104-2, 104-3, 104-4. (collectively referred to as "inverted corner(s) 104"). The inverted corners 104 extend from the top side 106 of the trailer jack support 100 to the bottom side of the trailer jack support 100.

FIGS. 1 through 6 also displays a rectangular recess 122 defined in the top side 106 of the trailer jack support 100. The rectangular recess 122 extends into the trailer jack support 100 in a half-moon shape 108. As described in more detail herein, the rectangular recess 122 and the half-moon shape 108 may be used to retain a caster, a wheel, or similar round device that may seat within the half-moon shape 108. In this manner, a trailer hitch jack with a round wheel or a caster may be seated within the rectangular recess 122 so as to engage within the half-moon shape 108 of the rectangular recess 122 defined the top side 106.

In one example, a circular void 110 may be defined in the bottom of the rectangular recess 122. The circular void 110 extends further into the trailer jack support 100 with respect to the rectangular recess 122. However, the circular void 110 does not extend through the bottom side of the trailer jack support 100. In one example, a trailer hitch jack may include a circular pipe. In some instances, the trailer hitch jack may not include a foot or stabilizer and may simply include just a circular pipe or other cylindrical element. The circular pipe may be seated inside the circular void 110 via the rectangular recess 122. In this manner, the trailer jack support 100 may be used to support this additional form factor of the trailer hitch jack that interfaces with the trailer jack support 100.

Further, the trailer hitch jack may include a circular stabilizer, circular foot, or similar type of round element. If the circular stabilizer or foot is smaller than the circular void 110, the circular stabilizer or foot may be placed inside the circular void 110 in a manner similar to the circular pipe as described above. Further, if the circular stabilizer or foot is larger than the circular void 110, the circular stabilizer or foot be placed on the top side 106 of the block in the middle of, and between, the protrusions 102. Still further, if the circular stabilizer or foot is too large to seat between the protrusions 102, the circular stabilizer or foot may be placed on top of each of the protrusions 102 as similarly described above in connection with the rectangular or square foot or stabilizer.

FIG. 2 illustrates a top view of the trailer jack support 100. The sides 116 and the top side 106 of the trailer jack support 100 are depicted. Further, as depicted in FIG. 2, the top perimeter 112 is smaller than the bottom perimeter 114, thus creating the square frustum or trapezoidal shape described herein. Still further, the trailer jack support 100 includes the inverted corners 104 that extend from the top side 106 located at the top side 106 to the bottom perimeter 114.

FIG. 2 also illustrates protrusions 102 extending from the top side 106 of the trailer jack support 100. The notches 120 are defined in each of the protrusions 102 on a corner of a respective protrusion 102 closest to the center of the trailer jack support 100. In one example, a trailer that has a rectangular or square stabilizer or foot may be placed on the top side 106 engaging with notches 120 to secure the rectangular or square stabilizer or foot in place.

The trailer jack support 100, as shown in FIG. 2 may include the rectangular recess 122 including the half-moon shape 108 defined the top side 106 of the block. At the bottom of the half-moon shape 108 of the rectangular recess 122 is defined the circular void 110 which extends into the trailer jack support 100.

FIG. 3 illustrates a first side view of the trailer jack support 100. Side 116-1 of the trailer jack support 100 is depicted in FIG. 3. It can also be seen that the top perimeter 112 is smaller than the bottom perimeter 114, thus creating the square frustum or trapezoidal shape described herein. Further, the trailer jack support 100 as depicted in FIG. 3 includes inverted corners 104-1 and 104-4 defined in side 116-1 and that extend from the top side 106 located at the top side 106 to the bottom perimeter 114.

FIG. 4 illustrates a second side view of the trailer jack support. Side 116-2 of the trailer jack support 100 is depicted in FIG. 4. It can also be seen that the top perimeter 112 is smaller than the bottom perimeter 114, thus creating the square frustum or trapezoidal shape described herein. Further, the trailer jack support 100 as depicted in FIG. 4 has inverted corners 104-1 and 104-4 that extend from the top perimeter 112 located at the top side 106 to the bottom perimeter 114.

FIG. 5 illustrates a third side view of the trailer jack support of FIG. 1. Side 116-3 of the trailer jack support 100 is depicted in FIG. 5. It can also be seen that the top perimeter 112 is smaller than the bottom perimeter 114, thus creating the square frustum or trapezoidal shape described herein. Further, the trailer jack support 100 as depicted in FIG. 5 includes inverted corners 104-2 and 104-3 defined in side 116-3 and that extend from the top perimeter 112 located at the top side 106 to the bottom perimeter 114.

FIG. 6 illustrates a fourth side view of the trailer jack support of FIG. 1. Side 116-4 of the trailer jack support 100 is depicted in FIG. 6. It can also be seen that the top perimeter 112 is smaller than the bottom perimeter 114, thus creating the square frustum or trapezoidal shape described herein. Further, the trailer jack support 100 as depicted in FIG. 6 has inverted corners 104-3 and 104-4 that extend from the top perimeter 112 located at the top side 106 to the bottom perimeter 114.

Figure 7:
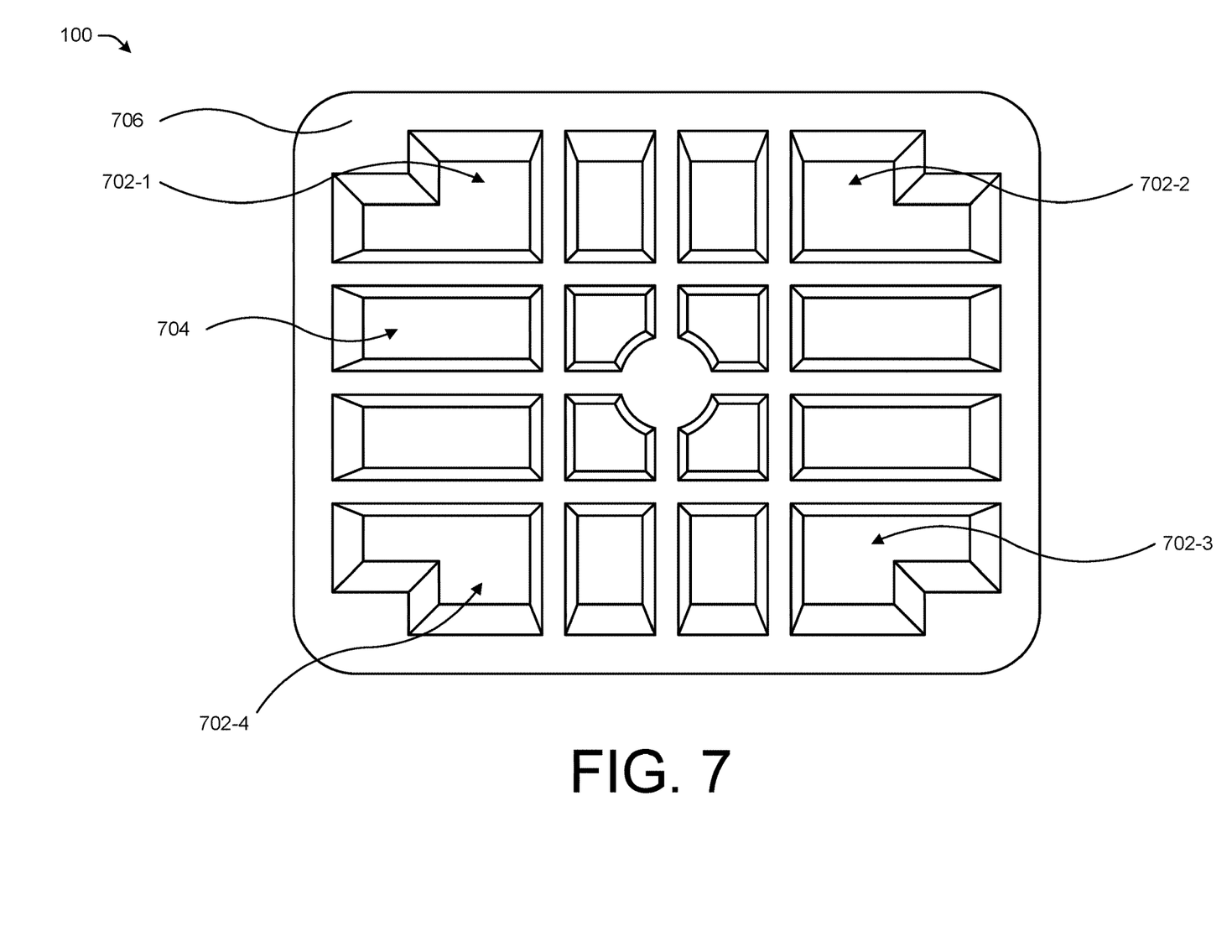
FIG. 7 illustrates a bottom view of the trailer jack support of FIG. 1.

FIG. 7 illustrates a bottom view of the trailer jack support 100 of FIG. 1. In this view only the bottom side 706 of the trailer jack support 100 is shown. On the bottom side 706 of the trailer jack support 100 there are a number of auxiliary recesses 704 defined in and extending into the trailer jack support 100. The auxiliary recesses 704 defined in the bottom side 706 of the trailer jack support 100 may serve a number of purposes including a means by which materials used in the trailer jack support 100. Further, the auxiliary recesses 704 defined in the bottom side 706 of the trailer jack support 100 serve to provide surfaces against which uneven ground and/or loose ground materials such as, for example, sand, loose dirt, mud, rocks, gravel, and other materials may conform to, allowing the bottom side 706 of the trailer jack support 100 to grip with the uneven ground and/or loose ground materials and reducing the potential of the trailer jack support 100 moving laterally with the forces placed on the trailer jack support 100. In this manner, the chances of the trailer jack support 100 slipping or otherwise moving away from a load placed thereon is significantly reduced or eliminated.

Figure 8:
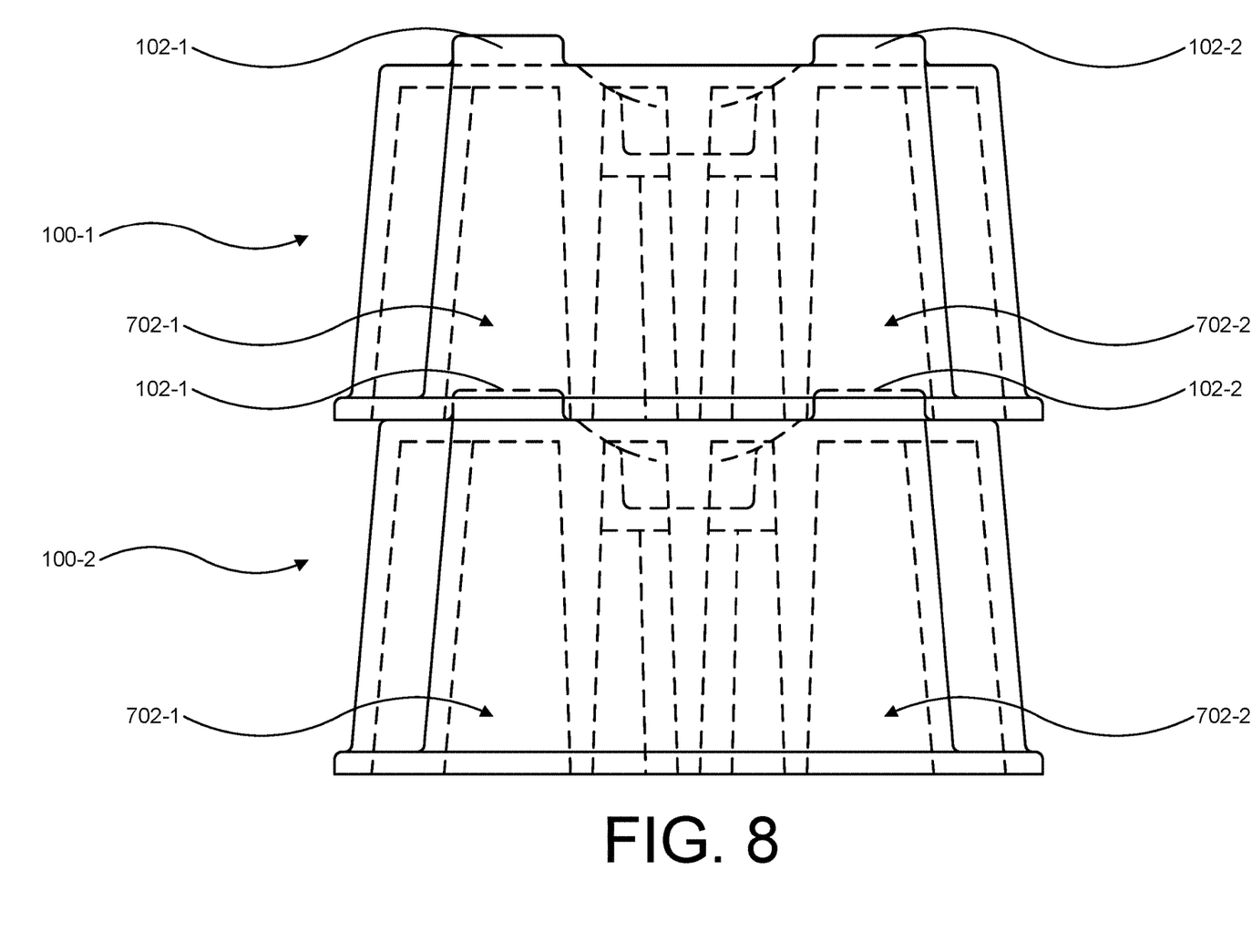
FIG. 8 illustrates a stacked assembly view of multiple trailer jack supports of FIG. 1 coupled together.

Further, a number of protrusion recesses 702-1, 702-2, 702-3, and 702-4 (collectively referred to as "protrusion recess(es) 702") are defined in and extend into the bottom side 706 of the trailer jack support 100 on the corners of the bottom side 706. The protrusion recesses 702 may engage with protrusions 102 on the top side 106 of a second trailer jack support 100 such that a first trailer jack support 100 may mechanically engage with a second trailer jack support 100. Indeed, FIG. 8 illustrates a stacked assembly view of multiple trailer jack supports 100-1, 100-2 of FIG. 1 coupled together.

In one example, a tongue of a trailer may be situated high off the ground in order to obtain a level chassis of the so that the trailer may maintain balance. Thus, a second trailer jack support 100-2 may be placed on the ground with a first trailer jack support 100-1 being placed on top of the second trailer jack support 100-2. When the first trailer jack support 100-1 is placed on top of the second trailer jack support 100-2, the protrusion recesses 702 defined in the bottom side 706 of the first trailer jack support 100-1 mechanically engage with the protrusions 102 on the top side of the second trailer jack support 100-2. In one example, the protrusions 102 of the second trailer jack support 100-2 may engage with the protrusion recesses 702 of the first trailer jack support 100-1 via an engineering fit such as, for example, a clearance fit (e.g., one of a loose running fit, a free running fit, a close running fit, a sliding fit, and a location fit), a transition fit (e.g., one of a similar fit, and a fixed fit), and an interference fit (e.g., one of a press fit, a driving fit, and a forced fit). The engineering fit may define a clearance between two mating parts (e.g., the protrusions 102 with respect to the protrusion recesses 702), and the size of this clearance determines whether the parts can, at one end of the spectrum, move or rotate independently from each other or, at the other end, are temporarily or permanently joined together.

This ability to stack a first trailer jack support 100-1 with at least a second trailer jack support 100-2 creates a taller trailer jack support system to accommodate taller trailers or trailer hitches that are relatively higher off the ground when the chassis of the trailer is level. As depicted in FIG. 8, the first trailer jack support 100-1 is depicted as being stacked on the second trailer jack support 100-2. As described above, the recessed portions which extend into the bottom side 706 of the first trailer jack support 100-1 will engage with the protrusions which extend from the top side of the second trailer jack support 100-2. Further, two or more blocks may be stacked upon another.

CONCLUSION

While the present apparatus is described with respect to the specific examples, it is to be understood that the scope of the present apparatus is not limited to these specific examples. Since other modifications and changes varied to fit particular operating requirements and environments will be apparent to those skilled in the art, the present systems and methods are not considered limited to the example chosen for purposes of disclosure, and covers all changes and modifications which do not constitute departures from the true spirit and scope of the present apparatus.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A trailer jack support apparatus comprising:
a monolithic block having six sides, the six sides comprising a first side, a second side, a third side, a fourth side, a fifth side, and a sixth side;
the first side and the second side being opposite the first side, the first side and the second side having a first same length;
the third side and the fourth side being opposite the third side, the third side and the fourth side having a second same length;
a recess defined in the fifth side, the recess including at least one void defined in the recess of the fifth side;
at least two protrusions extending from the fifth side; and
a first notch defined in a first protrusion of the at least two protrusions and a second notch defined in a second protrusion of the at least two protrusions, the first notch and the second notch facing the recess defined in the fifth side to align a rectangular stabilizer between the at least two protrusions.

2. The trailer jack support apparatus according to claim 1, wherein the first monolithic block is made of recycled plastic.

3. The trailer jack support apparatus according to claim 1, further comprising at least one inverted corner defined in a junction between two of the first side, the second side, the third side, and the fourth side.

4. The trailer jack support apparatus according to claim 1, wherein the first side and the second side are shorter in length than the third side and the fourth side.

5. The trailer jack support apparatus according to claim 1, wherein:
the at least one void defined in the recess of the fifth side is: a rectangular void defined in the fifth side, the rectangular void dimensioned to accept the rectangular stabilizer, a rectangular foot, or combinations thereof, the fifth side further comprises:
at least one half-moon void defined in the fifth side, the half-moon void dimensioned to accept a wheel,
a circular void defined in the fifth side, the circular void dimensioned to accept a pipe, a circular stabilizer, a circular foot, or combinations thereof, or
combinations of the rectangular void, the half-moon void, and the circular void.

6. The trailer jack support apparatus according to claim 1, further comprising at least two protrusion recesses defined in the sixth side of the monolithic block.

7. The trailer jack support apparatus according to claim 6, wherein:
the monolithic block is a first monolithic block, and the at least two protrusions that extend from the fifth side of the first monolithic block are configured to engage with the at least two protrusion recesses defined in side of a second monolithic block such that the second monolithic block is stackable on and engageable with the first monolithic block.

8. An apparatus comprising:
a square frustum having six sides, the six sides comprising a first side, a second side, a third side, a fourth side, a fifth side, and a sixth side;
the first side and the second side being opposite the first side;
the third side and the fourth side being opposite the third side;
a recess defined in the fifth side, the recess including at least one void defined in the recess of the fifth side;
at least two protrusions extending from the fifth side; and
a first notch defined in a first protrusion of the at least two protrusions and a second notch defined in a second protrusion of the at least two protrusions, the first notch and the second notch facing the recess defined in the fifth side to align a rectangular stabilizer between the at least two protrusions.

9. The apparatus according to claim 8, wherein the square frustum is made of plastic.

10. The apparatus according to claim 8, further comprising at least one inverted corner defined in a junction between two of the first side, the second side, the third side, and the fourth side.

11. The apparatus according to claim 8, wherein the fifth side of the square frustum has a smaller perimeter than the sixth side of the square frustum.

12. The apparatus according to claim 8, wherein:
the at least one void defined in the recess of the fifth side is: a rectangular void defined in the fifth side, the rectangular void dimensioned to accept the rectangular stabilizer, a rectangular foot, or combinations thereof, the fifth side further comprises:
at least one half-moon void defined in the fifth side, the half-moon void dimensioned to accept a wheel,
a circular void defined in the fifth side, the circular void dimensioned to accept a pipe, a circular stabilizer, a circular foot, or combinations thereof, or combinations of the rectangular void, the half-moon void, and the circular void.

13. The apparatus according to claim 8, comprising at least four protrusions extending from the fifth side.

14. The apparatus according to claim 8, wherein four or more protrusion recesses are defined in the sixth side.

15. The apparatus according to claim 8, wherein:
the square frustum is a first square frustum, and
a side of a second square frustum stacks on the fifth side of the first square frustum.

16. A trailer jack support apparatus comprising:
a monolithic block comprising a first side, a second side, a third side, a fourth side, a fifth side, and a sixth side;
the first side and the second side opposite the first side, the first side and the second side having a same length;
the third side and the fourth side opposite the third side, the third side and the fourth side having a second same length;
the first side and the second side having a shorter length than the third side and the fourth side;
four inverted corners defined in a junction between two of the first side, the second side, the third side, and the fourth side; and a recess defined in the fifth side, the recess including at least one void defined in the recess of the fifth side, the at least one void stopping at the sixth side.

17. The trailer jack support apparatus according to claim 16, the monolithic block further comprising:
four protrusions extending from the fifth side;
a notch defined in a respective corner of the four protrusions,
wherein a first notch defined in a first protrusion of the four protrusions, a second notch defined in a second protrusion of the four protrusions, a third notch defined in a third protrusion of the four protrusions, a fourth notch defined in a fourth protrusion of the four protrusions face the recess defined in the fifth side to align a rectangular stabilizer, a rectangular foot, or combinations thereof between the four protrusions;
four or more recesses defined in the sixth side, the four or more recesses in the sixth side including different shaped recesses.

18. The trailer jack support apparatus according to claim 16, wherein the monolithic block is made of plastic, recycled plastic, wood, metal, or a combination thereof.

19. The trailer jack support apparatus according to claim 16, wherein:
the at least one void defined in the recess of the fifth side is a rectangular void defined in the fifth side, the rectangular void dimensioned to accept a rectangular stabilizer, a rectangular foot, or combinations thereof, the fifth side further comprises:
at least one half-moon void defined in the fifth side, the half-moon void dimensioned to accept a wheel,
a circular void defined in the fifth side, the circular void dimensioned to accept a pipe, a circular stabilizer, a circular foot, or combinations thereof, or
combinations of the rectangular void, the half-moon void, and the circular void.

* * * * *